Figure 1:
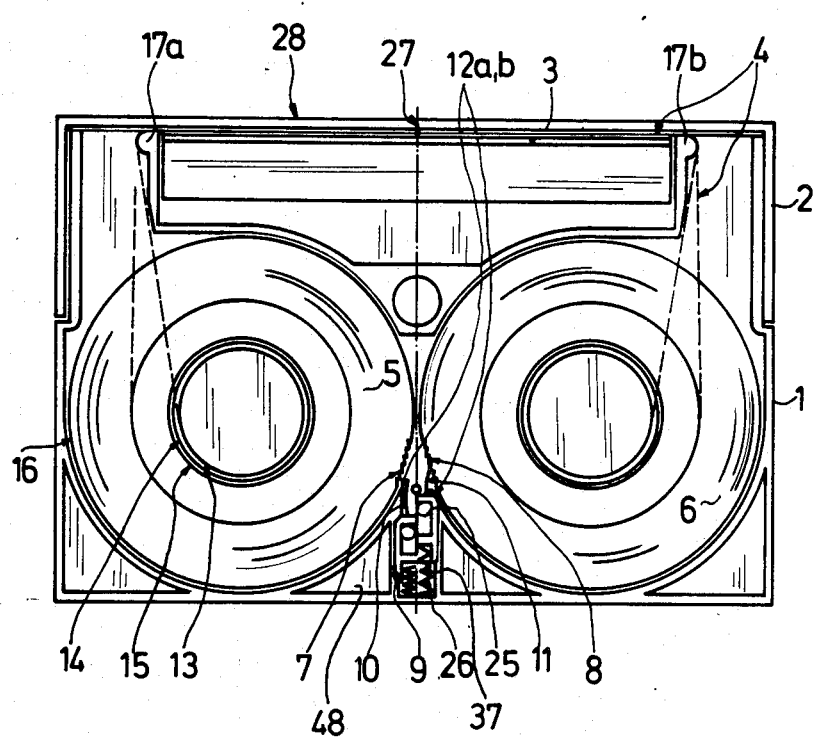

United States Patent [19]

Schoettle

[11] Patent Number: 4,678,140

[45] Date of Patent: Jul. 7, 1987

[54] TAPE CASSETTE HAVING A MOUNTING FOR A LEG SPRING FOR A REEL BRAKE SPRING

[75] Inventor: Klaus Schoettle, Heidelberg, Fed. Rep. of Germany

[73] Assignee: BASF Aktiengesellschaft, Ludwigshafen, Fed. Rep. of Germany

[21] Appl. No.: 758,969

[22] Filed: Jul. 25, 1985

[30] Foreign Application Priority Data

Jul. 25, 1984 [DE] Fed. Rep. of Germany ... 8422103[U]

[51] Int. Cl.⁴ ............................................ G03B 1/04
[52] U.S. Cl. .................................. 242/199; 242/198; 360/132

[58] Field of Search ................................. 242/197-200, 242/204; 360/132, 137

[56] References Cited

U.S. PATENT DOCUMENTS

| 4,106,724 | 8/1978 | Higashida | 242/198 |
| 4,148,443 | 4/1979 | Lundquist | 242/198 X |
| 4,579,295 | 4/1986 | Harada | 242/198 |

Primary Examiner—Donald Watkins
Attorney, Agent, or Firm—Keil & Weinkauf

[57] ABSTRACT

In a tape cassette having a mounting for a leg spring, in particular a brake spring in a tape cassette, the spring is held partly or completely either at the inner periphery or at the outer periphery, so that the brake element and the spring form a unit which can be preassembled and in which the spring is held so that it cannot be lost.

15 Claims, 5 Drawing Figures

TAPE CASSETTE HAVING A MOUNTING FOR A LEG SPRING FOR A REEL BRAKE SPRING

The present invention relates to a tape cassette having a mounting for a leg spring, in particular for a reel brake system in a tape cassette, the middle part of the leg spring being attached to a brake element, and the spring arms being supported on housing parts, and the mounting for this purpose.

Known magnetic tape cassettes contain reel brakes which in general are spring-mounted on the housing so that they secure the reels against unintentional rotation when the cassettes are not inserted in the apparatus. The brake elements are generally such that they can only be inserted into a housing part during assembly, and the spring supporting the brake element can only be inserted thereafter. The springs are frequently in the form of spiral springs or plate springs whose ends are supported on appropriate lugs, projections or pins on the housing and/or on the brake element or even between the brake elements (cf. German Laid-Open Application DOS No. 2,910,783). Even after assembly, these known springs are only loosely connected to the brake element and the housing walls.

In German Laid-Open Application DOS No. 2,918,271, the brake spring, together with two brake elements, forms a single unit made of plastic. The disadvantage here is that these plastic springs become weakened with time due to thermoplastic flow and can then no longer perform their supporting function so that finally the braking function too is no longer ensured.

It is an object of the present invention to provide a tape cassette having a mounting for the brake spring, in which the spring is prevented, at as early a stage as possible, from falling out or changing its position.

We have found that this object is achieved, in accordance with the invention, by a tape cassette having a mounting for a leg spring, in particular for a reel brake system, the middle part of the leg spring being arranged in an open space of a brake element and the spring arms being supported on housing parts, which comprises a holding element which has a cross-sectional dimension which is at least slightly larger than the largest dimension of the aperture of the middle part of the leg spring, so that, after it has been mounted, the spring is held, so that it cannot be lost, by radial tension acting on the middle part.

We have found that this object is likewise achieved by a tape cassette having a mounting of the same type, which comprises a holding element which has an opening for receiving the middle part of the leg spring, which is slightly larger than the outer contour of the middle part, the said opening partially or completely surrounding the middle part and partially supporting the spring arms so that, as a result of the lateral force exerted by the spring arms, the spring is held so that it cannot be lost.

Consequently, it is possible to provide, in an advantageous manner, a preselectable spring and brake unit which can be premounted. Furthermore, by using this unit, it is possible to prevent the spring or the brake element from falling out, even after insertion into the housing, which is simplified as a result of the unit being larger.

The advantage of preventing the spring from falling out is very important in the case of standard video cassettes of the conventional systems, since the reject rate and the necessity of repeating work are reduced. In smaller types of cassette, eg. the 8 mm video cassette, the brake element, the spring and the remaining cassette dimensions are very small; this small size gives rise to frequent problems during cassette manufacture and may necessitate repair work on the cassettes, for example as a result of the spring jumping out.

In a practical embodiment, the holding element which enters the middle part of the leg spring or spiral spring can be a square pin whose diagonal dimension is slightly larger than the diameter of the aperture of the middle part of the spring.

In an advantageous embodiment, the receiving aperture surrounding the periphery of the middle part of the spring can be a roughly semi-cylindrical recess in the brake element, which recess may furthermore advantageously possess a U-shaped cross-section. Consequently, the spring arms rest against the straight walls of the recess before emerging from the latter, thus achieving a predetermined orientation of the spring arms.

In a further embodiment of this holding element, the height of the latter should be about the same as, or greater than, the height of the middle part of the spring, thus facilitating reliable mounting of the spring in the axial direction too.

Advantageously, the spring used is held by the holding element in a position in which the spring arms are under tension laterally, thereby increasing the utilizable spring force and ensuring that the spring is better secured against falling out.

The present invention furthermore relates to the mountings themselves, in particular those for a video tape cassette.

Embodiments of the invention are illustrated in the drawing and described below.

Figure 3:
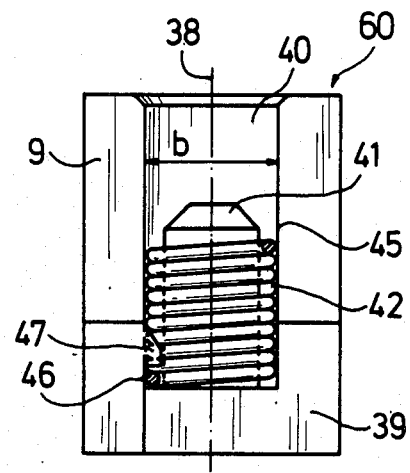
Figure 2:
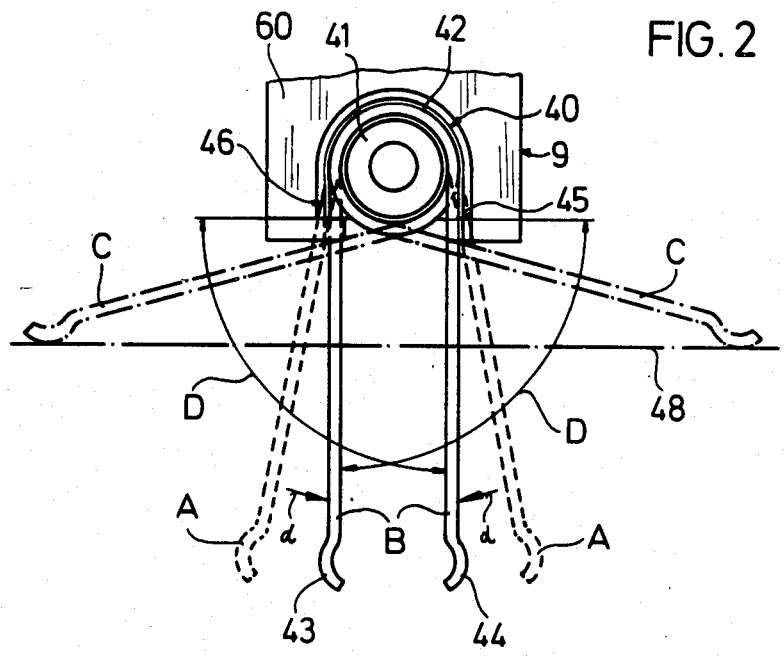
Figure 4:
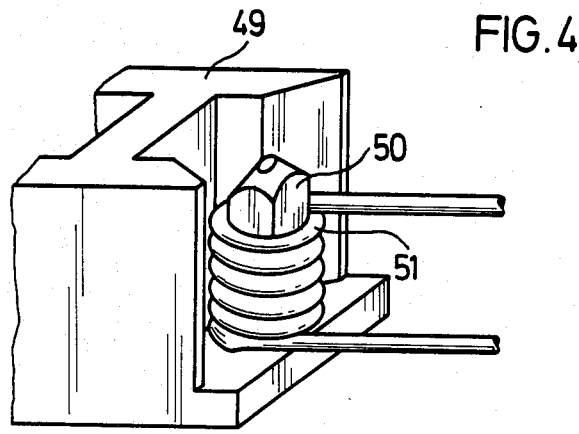
Figure 5:
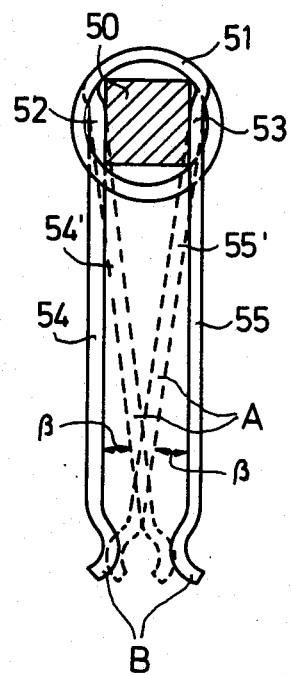

FIG. 1 is a diagram of an 8 mm video cassette having the standard reel brake and a spiral spring, FIGS. 2 and 3 show the novel mounting on the brake element, and FIGS. 4 and 5 show a further embodiment of the novel mounting.

A tape cassette, for example an 8 mm video cassette, consists of the housing 1, the front flap 2 and the dust flap 3, between which the tape 4, when not threaded in the apparatus, is held by means of the guide elements 17 a/b on the housing, and the reels 5 and 6 with hubs 13. The movement of the front flap 2 and of the dust flap 3 is described in, for example, British Patent No. 2,115,782. The tape 4 at the front of the cassette must be held under tension within narrow tolerances since otherwise, when the flaps are closed, the ends of the flaps would grip or crease the tape 4 and/or deflect it from the normal position.

The brake system consists of a brake base 9 which can be displaced by means of an actuating pin 25 penetrating from outside and is held under compressive stress against the reels 5 and 6 by a pressure spring 26 mounted between housing 1 and the base. The base 9, which usually consists of plastic, is provided at the front with two plate spring-like, pointed locking elements 10 and 11, each of which is assigned to a reel 5 or 6.

During the braking operation, which takes place automatically when the cassette is removed from the apparatus, displacement of the brake element 9 toward the front 28 of the cassette causes the points of the springy locking elements 10 and 11 to engage the teeth 7 and 8 of the flange toothing of the reels 5 and 6.

In the release position of the reels 5 and 6, the locking elements 10/11 are pressed toward the central transverse axis 27 by being deflected (cf. locking element 10 in FIG. 1, left-hand side) by means of stops 12 a/b on the housing, so that the points of the locking elements are removed from the area of operation of the reels 5 and 6.

The pressure spring 26 is a coil spring which is held at one end in a recess 37 of the brake element 9. Since the ends of such coil springs can never be produced so that they are exactly parallel, these springs frequently exert not only the desired axial force but also radial forces, with the result that such brake elements 9 jump out of the housing halves of the cassette during the assembly process even when small shocks are experienced.

In FIG. 2, the brake element 9 has, at its rear end, a mounting 60 which possesses a recess 40 which is roughly U-shaped in cross-section and is closed at the lower end by a base part 39. A centering pin 41 is fixed on the base part 39, at right angles to the latter and concentrically with the axis 38 of the circular part of the U-shape, or forms and integral part of the said base part. This pin 41 can be omitted, even when the spring 42 is under great radial tension. The diameter of the centering pin 41 is smaller than the internal diameter of the spring 42. The width b of the recess (40) is chosen to be either smaller than, about the same as or slightly larger than the diameter of the spring, which in this case is a spiral spring 42 having a large number of individual windings. Before the spiral spring 42 is inserted into the recess 40, the spring arms 43 and 44 are pressed together from a position A at least into the position B by means of an insertion apparatus which is not shown. After insertion, the spring 42 is held, so that it cannot be lost, in the recess 40 by means of the initial lateral tensile force of the spring arms 43 and 44, which are supported on the walls 45 and 46. When the width b of the recess is smaller than the diameter of the middle part, the latter has to be compressed radially in order to insert the spring 42, possibly using an additional tool. It is advantageous in practice if the semi-circular cross-section of the recess 40, which as such is adequate, is modified by extending the side walls 45 and 46 to give a U-shaped cross-section, so that the line of contact of the spring arms 43 and 44 is lengthened. For additional locking of the spring in the axial direction, the spring arm 43 snaps over a locking ramp 47 when the spring 42 is inserted, the said locking ramp being located in front of the recess 40 and additionally securing the spring 42 against falling out of the recess 40.

When the spring 42 is under sufficiently great initial tension, the locking ramp 42 can be dispensed with.

In this form (position B), the spring 42 is premounted in a fixed position in the brake element 9 and prepared for insertion into the cassette housing 1. For the insertion process, the arms are brought from position B to position C by tensioning them over the tensioning angle D. In position C, the spring arms 43 and 44 are supported on the inner wall 48 of the housing (indicated schematically in FIG. 2 by a dot-dash line).

FIGS. 4 and 5 show a further embodiment of the mounting. Here, fastening is effected in a brake element 49 whose base wall is provided with a pin 50 which tapers at the point and has a cross-sectional dimension which is at least slightly larger than the largest dimension of the aperture of the middle part of the spring 51. It is advantageous if the pin used has a square cross-section, the pin 51 being pushed onto the said spring under compressive strain and hence being secured against falling out by radial tension, so that it cannot be lost. In theory, lune-like, triangular and other polygonal forms of the pin 50 are possible. The transition piece 52, 53 of the spring 51 between the middle part (the spiral) of the spring 51 and the spring arms 54, 55 is matched to the shape of the pin 50 so that the spring is mounted and oriented in a specific manner on assembly. The spring arms are represented by dashed lines in the relaxed position A (54' and 55'), and by solid lines in the initial mounted position B (54 and 55) with lateral tensioning of the spring arms. The angles between the positions A and B in FIGS. 2 and 5 are $\alpha$ and $\beta$, respectively, these angles indicating the size of the predetermined tensioning force.

The novel mounting for a leg spring provides in practice a tape cassette which can be more advantageously assembled. The mounting can advantageously be used for cassettes of any type, such as audio, video and data cassettes and other cassettes for information storage, and any cassette of this type is likewise embraced by the present patent in connection with the claimed mounting.

We claim:

1. A tape cassette, in particular a video tape cassette, having a housing with a mounting for a torsion spring, in particular for a reel brake system, including a brake element, in the tape cassette, said torsion spring including a generally cylindrical center section, forming an aperture therein, and two spring arms extending from the two ends respectively of said center section, the center section of the torsion spring being attached to said brake element and the spring arms being supported on housing parts, which comprises a holding element has a cross-sectional dimension which is at least slightly larger than the largest dimension of the aperture of the center section of the torsion spring, so that, after it has been mounted on the holding element, the spring is held, so that it cannot be lost, by radial tension acting on the center section.

2. A cassette as claimed in claim 1, wherein the holding element is a square pin whose diagonal dimension is slightly larger than the diameter of the aperture of the center section of the spring.

3. A cassette as claimed in claim 2, wherein the height of the pin is about the same as the height of the center section of the spring.

4. A tape cassette, in particular a video tape cassette having a housing with a mounting for a torsion spring, in particular for a reel brake system, including a brake element, in the tape cassette, said torsion spring including a generally cylindrical center section, forming an aperture therein and two spring arms extending from the two ends respectively of said center section, the center section of the torsion spring being connected to said brake element and the spring arms being supported on housing parts, which comprises a holding element which has an opening for receiving the generally cylindrical center section of the torsion spring, which is roughly as large as the outer contour of the center section, said opening at least partially surrounding the center section and partially supporting the spring arms so that, as a result of the compressive force of the compressed center section or the lateral force of the spring arms, the spring is held so that it cannot be lost.

5. A cassette as claimed in claim 4, wherein the holding element is a roughly semi-cylindrical recess in the brake element.

6. A cassette as claimed in claim 4, wherein the single recess is provided in the brake element and has a U-shaped cross-section for supporting the spring arms.

7. A cassette as claimed in claim 5, wherein a centering pin is provided in the center of the recess.

8. A cassette as claimed in claim 7, wherein the height of the peg or of the centering pin is no less than the height of the center section of the spring.

9. A cassette as claimed in claim 1, wherein the transition part between the center section and the spring arm is matched to the cross-section of the holding element so that the spring can be mounted in the correct position.

10. A cassette as claimed in claim 4, wherein a locking pin for a spring arm of the spring is provided on the brake element.

11. A cassette as claimed in claim 1, wherein the mounted spring is held by the holding element in a position in which the spring arms are under lateral tension.

12. A cassette as claimed in claim 1, wherein the spring inserted into the receiving opening is held in a position in which the spring arms are under lateral tension.

13. A mounting for a torsion spring of a reel brake system in the tape cassette as claimed in claim 1, the center section of the torsion spring being connected to said brake element and the spring arms being supported on housing parts, which comprises a pin which has a cross-sectional dimension which is at least slightly larger than the largest dimension of the aperture of the center section of the torsion spring, so that, after it has been mounted on the holding element the spring is held, so that it cannot be lost, by radial tension acting on the center section.

14. A mounting for a torsion spring of a reel brake system in the tape cassette as claimed in claim 4, the center section of th torsion spring being connected to said brake element and the spring arms being supported on housing parts, which comprises a pin which has a receiving opening for the generally cylindrical center section of the torsion spring, which is roughly as large as the outer contour of the center section, the receiving opening at least partially surrounding the center section and partly supporting the spring arms, so that the spring is held, so that it cannot be lost, by the compressive force of the compressed center section or the lateral force of the spring arms.

15. A cassette as claimed in claim 6, wherein a centering pin is provided in the center of the recess.

* * * * *